United States Patent
Decrop et al.

(10) Patent No.: US 11,588,704 B2
(45) Date of Patent: Feb. 21, 2023

(54) BROADBAND CELLULAR NETWORK DEPLOYMENT FRACTAL GENERATION

(71) Applicant: International Business Machines Corporation, Armonk, NY (US)

(72) Inventors: Clement Decrop, Arlington, VA (US); Michael Bender, Rye Brook, NY (US); Martin G. Keen, Cary, NC (US); Hernan A. Cunico, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 17/194,350

(22) Filed: Mar. 8, 2021

(65) Prior Publication Data

US 2022/0286363 A1 Sep. 8, 2022

(51) Int. Cl.
| | |
|---|---|
| H04L 41/14 | (2022.01) |
| H04L 41/147 | (2022.01) |
| H04W 28/02 | (2009.01) |
| H04W 16/22 | (2009.01) |
| H04L 41/142 | (2022.01) |

(52) U.S. Cl.
CPC .......... *H04L 41/145* (2013.01); *H04L 41/142* (2013.01); *H04L 41/147* (2013.01); *H04W 16/22* (2013.01); *H04W 28/0247* (2013.01); *H04W 28/0268* (2013.01)

(58) Field of Classification Search
CPC ... H04L 41/145; H04L 41/142; H04L 41/147; H04W 16/22; H04W 28/0247; H04W 28/0268
See application file for complete search history.

(56) References Cited

U.S. PATENT DOCUMENTS

| | | | |
|---|---|---|---|
| RE44,606 E | 11/2013 | Herz | |
| 9,740,816 B2 | 8/2017 | He | |
| 10,469,104 B2 | 11/2019 | Kudekar | |
| 11,296,957 B2 * | 4/2022 | Xu | ..... H04L 41/5051 |

(Continued)

FOREIGN PATENT DOCUMENTS

AU 2002215307 B2 6/2007

OTHER PUBLICATIONS

"Build smarter mobile services and applications using IBM Cloud", Downloaded Dec. 17, 2020, 7 pages, <https://www.ibm.com/cloud/mobile>.

(Continued)

*Primary Examiner* — Chandrahas B Patel
(74) *Attorney, Agent, or Firm* — Randy Tejeda

(57) ABSTRACT

One or more computer processors generate a network fractal based on one or more predicted network conditions for a network that includes a change in user density, user device latency, and network throughput, wherein the network fractal is a deployment template comprised of a plurality of nodes. The one or more computer processors select a configuration of network infrastructure devices placed at each node in the plurality of nodes comprised in the generated network fractal. The one or more computer processors modify the network utilizing the generated network fractal and the selected configuration of network infrastructure devices. The one or more computer processors deploy the modified network.

17 Claims, 4 Drawing Sheets

(56) References Cited

U.S. PATENT DOCUMENTS

| | | | |
|---|---|---|---|
| 11,395,222 B2* | 7/2022 | Chiselko | H04W 24/02 |
| 2020/0336376 A1 | 10/2020 | Mahdi | |
| 2022/0029892 A1* | 1/2022 | Hooli | H04L 41/16 |
| 2022/0060346 A1* | 2/2022 | Sevindik | H04L 12/2801 |
| 2022/0103614 A1* | 3/2022 | Ganguli | H04L 67/10 |

OTHER PUBLICATIONS

"Euclidean space", Wikipedia, Last edited on Dec. 12, 2020, 16 pages, <https://en.wikipedia.org/wiki/Euclidean_space>.

"Fractal Foundation", Downloaded Dec. 17, 2020, 6 pages, <https://fractalfoundation.org/resources/fractal-software/>.

"Fractal", Wikipedia, Last edited on Dec. 16, 2020, 22 pages, <https://en.wikipedia.org/wiki/Fractal>.

"Hausdorff dimension", Wikipedia, Last edited on Dec. 5, 2020, 9 pages, <https://en.wikipedia.org/wiki/Hausdorff_dimension>.

"Lebesgue covering dimension", Wikipedia, Last edited on Nov. 2, 2020, 4 pages, <https://en.wikipedia.org/wiki/Lebesgue_covering_dimension>.

"Mandelbrot set", Wikipedia, Last edited on Dec. 2, 2020, 13 pages, <https://en.wikipedia.org/wiki/Mandelbrot_set>.

"Mathematics", Wikipedia, Last edited on Dec. 11, 2020, 13 pages, <https://en.wikipedia.org/wiki/Mathematics>.

"Measure (mathematics)", Wikipedia, Last edited on Nov. 16, 2020, 8 pages, <https://en.wikipedia.org/wiki/Measure_(mathematics)>.

"Menger sponge", Wikipedia, Last edited on Dec. 16, 2020, 6 pages, <https://en.wikipedia.org/wiki/Menger_sponge>.

"Self-similarity" Wikipedia, Last edited on Dec. 2, 2020, 6 pages, <https://en.wikipedia.org/wiki/Self-similarity>.

"The 5G Revolution", Downloaded Dec. 17, 2020, 15 pages, <https://www.ibm.com/industries/telecom-media-entertainment/resources/5g-revolution/>.

Ge, Xiaohu, et al., "Small Cell Networks with Fractal Coverage Characteristics," IEEE Transaction on Communications 66.11 (2018): 5457-5469, 14 pages.

Kumar et al., "5G Technology Market", Jul. 2019, 13 pages, https://www.alliedmarketresearch.com/5g-technology-market#:~text=5G Technology Market Outlook—2026,122.3% from 2021 to 2026. &text..>.

Maksymyuk, Taras, et al., "Fractal Geometry Based Resource Allocation for 5G Heterogeneous Networks," 2015 Second International Scientific-Practical Conference Problems of Infocommunications Science and Technology (PIC S&T), IEEE, 2015, 4 pages.

McCaskill, Steve, 5G microinfrastructure: microcells, femtocells and picocells explained, Mar. 23, 2020, 8 pages, <https://www.5gradar.com/features/5g-microinfrastructure-microcells-femtocells-and-picocells-explained>.

Popescu, Dalia-Georgiana, "Hyperfractals for the Modelling of Wireless Networks," Electromagnetism, Inria, 2018, Dissertation, 157 pages.

Shiffman, Daniel, "The Nature of Code", Downloaded Dec. 17, 2020, 40 pages, <https://natureofcode.com/book/chapter-8-fractals/>.

* cited by examiner

BROADBAND CELLULAR NETWORK DEPLOYMENT FRACTAL GENERATION

BACKGROUND

The present invention relates generally to the field of wireless technology, and more particularly to optimizing broadband cellular networks.

A fractal is a subset of Euclidean space whose fractal dimension strictly exceeds its topological dimension. Fractals exhibit similar patterns at increasingly smaller scales called self-similarity, also known as expanding symmetry or unfolding symmetry.

Mobile telecommunication systems were initially developed to provide a voice service while guaranteeing activity of a user. Mobile telecommunication systems have evolved to provide text and data services in addition to voice services. Increases in the number and demands of users of advanced mobile devices has generated a dramatic increase of traffic and higher-speed/bandwidth service requirements. For example, telecommunication advances have been key enablers for many technologies including video streaming and artificial intelligence (AI) to succeed by reducing or eliminating various limiting factors, such as sedentary operations, lower bandwidth communications, etc. Advances associated with 5G (fifth generation) telecommunication technologies are expected to serve as enablers to push dependent technologies to higher performance levels and capabilities through mobile bandwidths of 1 GBPS (gigabits/second) or greater, convergence of Internet-of-things (IoT) device access, etc.

SUMMARY

Embodiments of the present invention disclose a computer-implemented method, a computer program product, and a system. The computer-implemented method includes one or more computer processors generating a network fractal based on one or more predicted network conditions for a network that includes a change in user density, user device latency, and network throughput, wherein the network fractal is a deployment template comprised of a plurality of nodes. The one or more computer processors select a configuration of network infrastructure devices placed at each node in the plurality of nodes comprised in the generated network fractal. The one or more computer processors modify the network utilizing the generated network fractal and the selected configuration of network infrastructure devices. The one or more computer processors deploy the modified network.

DETAILED DESCRIPTION

Figure 1:
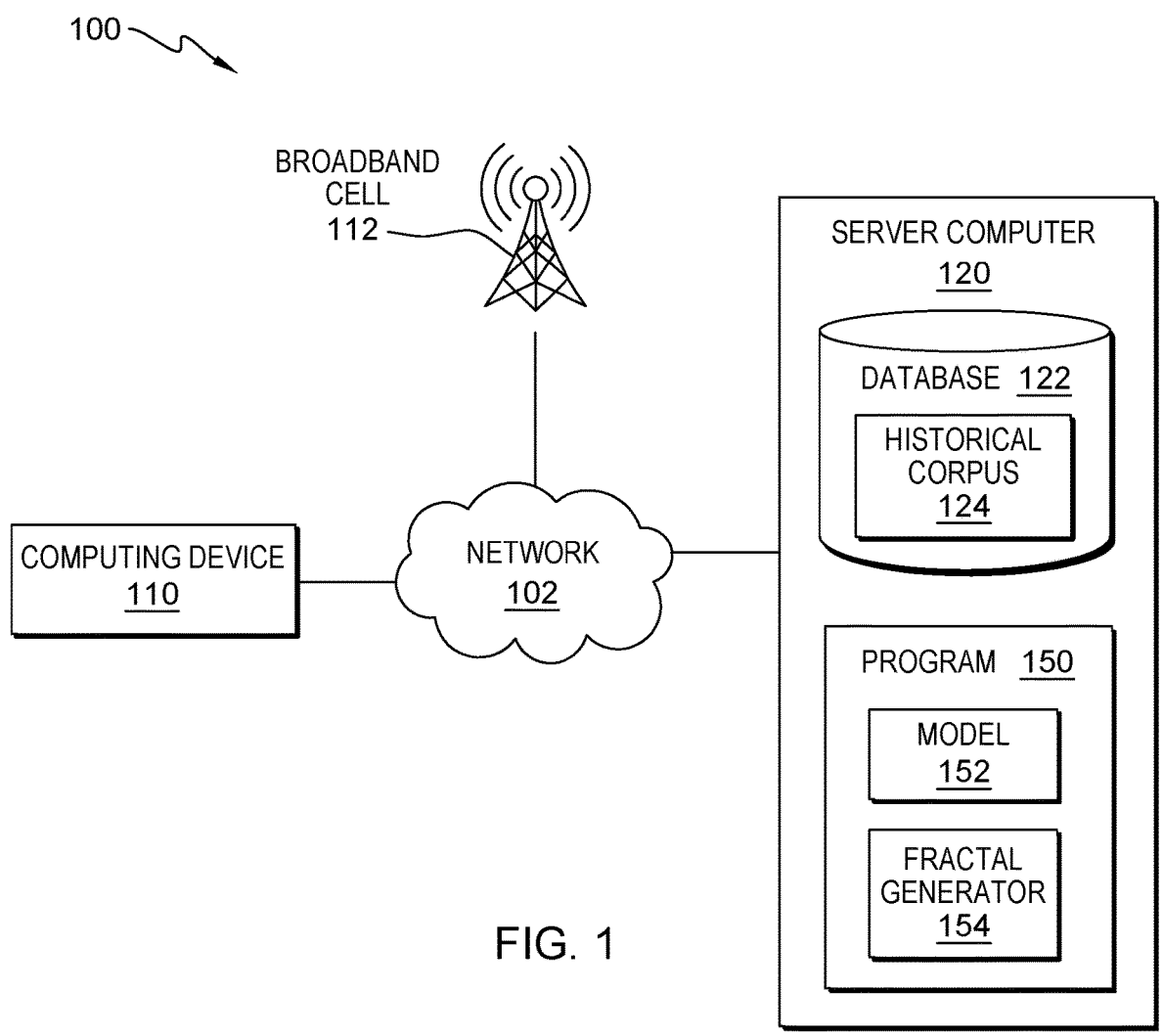
FIG. 1 is a functional block diagram illustrating a computational environment, in accordance with an embodiment of the present invention.

Generalized broadband cellular networks (i.e., 5G networks) are one of the breakthrough technologies of the decade. High speed broadband cellular networks allow connection of countless user device (e.g., IoT devices) and systems, while lowering latency and improving network reliability. However, designing, configuring, and deploying the towers, cells, and systems (i.e., macrocells (e.g., 5G towers), microcells, femtocells, picocells, etc.) associated with the broadband cellular network is a highly computationally intensive task, requiring large amounts of complied network data and human input. Furthermore, the continuously evolving nature of broadband cellular networks and associated user devices (e.g., devices entering and leaving geographical areas or service coverage areas) can present further complications and additional computational requirements. Mobile operators are responding by transforming the core layer of broadband cellular networks to meet the demands of such a diverse range of user devices and associated user groups, but often the addition or modification (e.g., moving an entire tower) of existing infrastructure is required. However, often it is impractical or expensive to install or move a piece of macro-infrastructure (i.e., macrocell) to conform with highly dynamic network conditions or changes.

Embodiments of the present invention reduce computational requirements of configuring and, subsequently, deploying an optimized broadband cellular network in a geographical region by leveraging generated fractals and historical trends. Embodiments of the present invention improve broadband cellular network deployment by predicting future network traffic and generating a network fractal capable of optimizing the broadband cellular network. Some embodiments of the present invention recognize that an optimized broadband cellular network is a network that efficiently distributes network traffic without a significant impact on quality of service (e.g., throughput, latency, etc.), without a substantial increase in power consumption, or without a significant disruption in service. In an example, a broadband cellular network is optimized if associated power requirements are minimized (i.e., global minimum) while maintaining an equal or higher quality of service. Embodiments of the present invention utilize generated fractals to produce a topology (e.g., density map) of the broadband cellular network. Embodiments of the present invention iterate through a plurality of generated fractals to identify one or more network fractals capable of improving or optimizing the network, such as remedying overserved or underserved areas; compensating for increased network loads in high density areas; and avoiding or minimizing service disruptions. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes computing device 110 (i.e., user device), broadband cell 112, server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, broadband cell 112, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Broadband cell 112 can be a standalone or an aggregated set of network infrastructure devices comprising a plurality of micro-infrastructures (e.g., compact antennas) deployed with a plurality of traditional macro-infrastructures (i.e., macrocells). Micro-infrastructure may include microcells, femtocells and/or picocells. A picocell is a small cellular base station typically covering a small area, such as in-building (offices, shopping malls, train stations, etc.). In broadband cellular networks, picocells are typically used to extend coverage to indoor areas where outdoor signals do not reach well, or to add network capacity in areas with very dense mobile phone utilization. A femtocell is a small, low-power cellular base station, typically designed for use in a home or small business. A microcell is a cell in a broadband cellular network (e.g., mobile phone network) served by a low power cellular base station (e.g., tower), covering a limited area such as a mall, a hotel, or a transportation hub. A microcell is usually larger than a picocell and a microcell uses power control to limit the radius of its coverage area. Similar to picocells, microcells are added to expand network capacity in areas with very dense phone utilization. Typically, the range of a microcell is less than two kilometers wide, whereas traditional base stations may have ranges of up to 35 kilometers while a picocell is 200 meters or less, and a femtocell is on the order of 10 meters. A macrocell is a cell in a broadband cellular network that provides high spread coverage served by a high power cell site (e.g., tower, antenna, or mast). Generally, a macrocell provides coverage larger than a microcell. Traditionally, the antennas for macrocells are mounted on ground-based masts, rooftops, and other existing structures, at a height that provides a clear view over the surrounding buildings and terrain.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing device 110 and broadband cell 112, within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical network deployments, historical generated fractals, and historical computing device information (e.g., historical applications, historical communication paths, associated users, etc.). In the depicted embodiment, database 122 contains historical corpus 124.

Historical corpus 124 comprises information regarding network towers or cells (e.g., traffic communicated through each tower, tower location, etc.), connected user devices (e.g., how many user devices are connected to each tower), connected user device locations, connected user device type (e.g., communication capacity and throughput), and associated geographic information (e.g., associated topography maps, building maps, etc.). In a further embodiment, historical corpus 124 contains associated network information for each identified tower or connected user device including technical network specifications such as supported network protocols, spectrum frequencies (e.g., cellular technology operating within the 900 MHz and 1800 MHz frequency bands), security protocols (e.g., pre-shared keys, challenge-response, etc.), power consumption statistics (e.g., peak power consumption, average power consumption, etc.), throughput statistics (e.g., error rates, bits per second, latency rates, jitter rate, transmission overhead, upload amount, upload rate, download amount, download rate, etc.), manufacturer details (e.g., model version, manufacturer ids, firmware version ids, related devices, etc.), and supported hardware architectures.

Program 150 is a program for delivering a broadband cellular network leveraging fractal generators and initiators. In various embodiments, program 150 may implement the following steps: generate a network fractal based on one or more predicted network conditions for a network that includes a change in user density, user device latency, and network throughput, wherein the network fractal is a deployment template comprised of a plurality of nodes; select a configuration of network infrastructure devices placed at each node in the plurality of nodes comprised in the generated network fractal; modify the network utilizing the generated network fractal and the selected configuration of network infrastructure devices; deploy the modified network. In the depicted embodiment, program 150 is a stand-alone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on computing device 110 and/or broadband cell 112 within computational environment 100. In the depicted embodiment, program 150 includes model 152 and fractal generator 154. Program 150 is depicted and described in further detail with respect to FIG. 2.

Model 152 is representative of a model utilizing deep learning techniques to train, calculate weights, ingest inputs, and output a plurality of solution vectors. Model 152 is trained to accurately predict future traffic patterns in a geographical region based on the current network deployment or a predicted network deployment (i.e., generated network fractal). Model 152 is trained from the information contained in historical corpus 124. In an embodiment, model 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 152 is a recurrent neural network (RNN) trained utilizing supervised training methods. The training of model 152 is depicted and described in further detail with respect to FIG. 2.

Fractal generator 154 is representative of an application or software designed to generate one or more network fractals. Fractal generator 154 leverages generators and initiators to create a plurality of fractals representative of proposed network deployments based on historical and predicted network traffic and conditions. In an embodiment, fractal generator 154 comprises a plurality of initiators (i.e., initial fractal shape) and a plurality of generators (i.e., fractal heuristic). In a further embodiment, fractal generator 154 applies a generator to an initiator at each step (e.g., k step), creating a new initiator with more nodes (e.g., broadband cellular network cells) than the previous step, where a node is an intersection point of an initiator and an applied generator. In an example, fractal generator 154 commences with an initiator comprising a straight line and divides said line into three equal segments or portions. Subsequently, fractal generator 154 creates an equilateral triangle (i.e., generator) utilizing the middle segment as a base. Responsively, fractal generator 154 removes the base, and continues the above steps for each subsequent step. In this example, the created equilateral triangle is applied to subsequent fractal iterations. In another embodiment, fractal generator 154 constructs unique generators and initiators developed for specific geographical areas (e.g., archipelagos, mountainous regions, etc.)

The present invention may contain various accessible data sources, such as database 122 and historical corpus 124, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
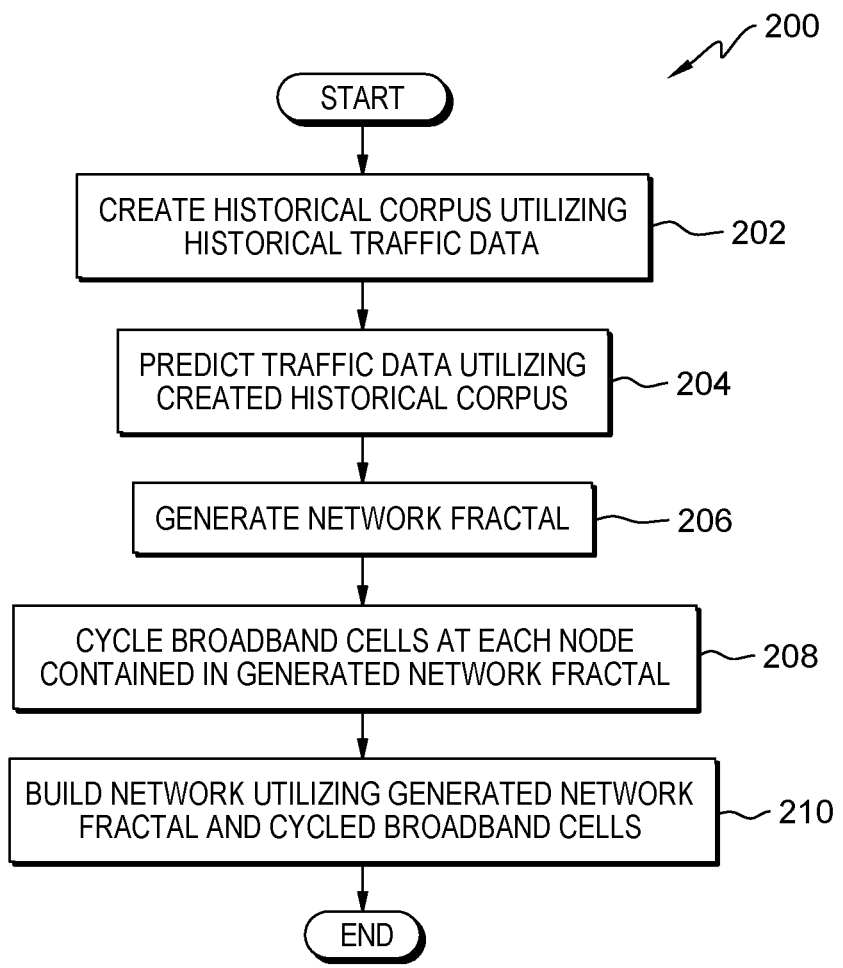
FIG. 2 is a flowchart depicting operational steps of a program, on a server computer within the computational environment of FIG. 1, for delivering a broadband cellular network leveraging fractal generators and initiators, in accordance with an embodiment of the present invention.

FIG. 2 depicts flowchart 200 illustrating operational steps of program 150 for delivering a broadband cellular network leveraging fractal generators and initiators, in accordance with an embodiment of the present invention.

Program 150 creates a historical corpus utilizing historical network data (step 202). In an embodiment, program 150 initiates upon user request. In another embodiment, program 150 initiates responsive to one or more performance reductions (e.g., increased network latency, decreased network throughput, increase in power consumption, damaged cells, etc.) associated with a broadband cellular network or broadband cell 112. In another embodiment, program 150 commences responsive to a newly added or identified broadband cell 112. In an embodiment, program 150 identifies how much traffic broadband cell 112 or any component communication device receives and transmits. In another embodiment, program 150 identifies how many user devices are connecting/utilizing each tower, cell, or system that comprise the broadband cellular network. In another embodiment, program 150 identifies one or more locations associated with each identified user device and broadband cell 112. For example, program 150 utilizes cellular triangulate to identify said locations. In a further embodiment, program 150 identifies a user device type (e.g., mobile phone, laptop, drone, etc.) and one or more respective user device capabilities (e.g., network capacity). In another embodiment, program 150 utilizes one or more geographic maps to develop a density topology (e.g., heat map) based on network traffic associated with the identified towers and user devices. In an embodiment, program 150 creates historical corpus 124 by leveraging network information collected from existing cellular companies, device manufacturers, compliant users, and associated devices. In another embodiment, program 150 identifies traffic patterns and incorporates said identified patterns into historical corpus 124. For example, program 150 identifies areas and temporal periods that experience above average traffic patterns.

Program 150 predicts traffic data utilizing created historical traffic corpus (step 204). In an embodiment, program 150 creates a plurality of training and testing sets utilizing historical corpus 124. In this embodiment, program 150 utilizes said training and testing sets to train model 152. In a further embodiment, program 150 utilizes model 152 and historical corpus 124 to predict future traffic patterns. For example, program 150 predicts which towers or cells are expected to be overloaded or overused based on a predicted increased in number of connected devices in a geographical area. In an embodiment, program 150 predicts the growth rate of connectable devices in a specific area. In an embodiment, program 150 utilizes linear regression techniques to predict future network conditions or changes in the broadband cellular network. For example, program 150 predicts that network traffic will grow exponentially in a city that has a corresponding high population growth rate. In another embodiment, program 150 trains model 152 to predict network traffic based on historical corpus 124. For example, program 150 incorporates user preferences (e.g., preferred networks, network interfaces, security protocols, cost constraints, etc.), geographical information (e.g., country, region, city, town, etc.), service subscription information (e.g., internet service contracts, stipulations, etc.) into model 152 to predict future network traffic. In an embodiment, program 150 utilizes k-folds testing to test model 152 for robustness and accuracy. In an embodiment, program 150 utilizes collected current network traffic measurements (i.e., measuring the amount and type of traffic on a particular network) as input for model 152. In this embodiment, program 150 utilizes current network traffic measurements and historical corpus 124 to predict future network traffic and locations associated with the predicted network traffic. In a further embodiment, program 150 identifies current broadband cellular network infrastructure that will be impacted by the predicted network traffic. Predictions may include temporal predictions (e.g., the user will utilize a specific application at a specific time), geographical predictions, predicted user device (e.g., client computing/user devices), predicted infrastructure utilization, predicted network interface, associated consumption predictions (e.g., power, data, system resources etc.), predicted security requirements, and predicted costs (e.g., power, transactional, system, and service based costs).

Program 150 generates a network fractal (step 206). In an embodiment, program 150 utilizes fractal generator 154 to generate a plurality of distinctive network fractals, each utilizing a different initiator and/or generator. For example, a unique generator and initiator can be created for each type of device, then the overlaying design of all the device types would represent said network fractal. In another embodiment, program 150 utilizes an overlapping generator to create a plurality of fractals that support unique device types at specific nodes of interest. In an embodiment, program 150 only generates network fractals that conform with the conditions of a geographical area (e.g., buildings, mountains, unpopulated subareas, inaccessible subareas, etc.), regulatory restrictions (e.g., spectrum restrictions, power restrictions, etc.), and user parameters (e.g., user thresholds, user priorities (e.g., power reduction, cost reduction, service area promotion). In the embodiments above, program 150 creates the fractal to subsequently configure or reconfigure a broadband cellular network to solve one or more network traffic density problems. In an embodiment, for areas that are extremely dense, program 150 utilizes a larger k such that more nodes are introduced into the fractal. Here, a larger k would proliferate the self-similar design (e.g., generator) to a more granular level, thus providing additional support for the areas with a larger cluster of predicted users and devices. For example, if a specific subarea or subregion is under question, then the iteration can change the k in that specific area, while not changing the fractal pattern in other areas.

Program 150 cycles broadband cells at each node contained in the generated network fractal (step 208). Responsive to each generated fractal, program 150, iteratively, cycles through each supported broadband cellular network infrastructure device (i.e., broadband cell 112) at each node in each generated network fractal. For example, program 150 alternates between a microcell, picocell, and femtocell at each node in the generated network fractal. In an embodiment, program 150 iteratively loops or cycles through a plurality of broadband cell placements at each node and based on the particular placement of a node, program 150 cycles through a plurality of possible connected devices at said nodes in order to maximize the connectivity (e.g., throughput, latency reduction, etc.) of the devices.

Responsively, program 150 simulates a plurality of intermittent network tests, utilizing predicted network traffic and devices, to determine one or more performance parameters and statistics associated with each cycled broadband cell at each node in each generated fractal. Here performance parameters include error rates, latency rates, transmission overhead, upload rate, and download rate. In a further embodiment, program 150 utilizes historical corpus 124 to store the results from one or more network tests. In an additional embodiment, program 150 simulates and records power consumption statistics of associated with each cycled broadband cell. In various embodiments, program 150 incorporates pricing information specific to the tested, cycled broadband cell such as cost per transaction, cost per unit of data, cost per unit of data dependent on existing conditions (e.g., cost during peak and non-peak hours, weather (e.g., service interruptions based on frigid conditions), etc.). In another embodiment, program 150 utilizes the network simulations to create an aggregate score representing the effectiveness off the fractal and associated node placements.

Responsive to an exhaustion of cycled broadband cells and generated fractals, program 150 compares predicted network traffic with various generated fractals unique broadband cell placement to develop an optimized network configuration. Here, program 150 selects one or more optimal network fractals (e.g., fractal with specific broadband cells at each node). In various embodiments, program 150 utilizes one or more thresholds, determined in advance, to control the placement of one or more nodes. For example, said thresholds may include how many devices exist in an area, number of broadband cells allocated in a certain area, broadband cell cost, broadband cell power consumption, etc. Here, a node and/or broadband cell is ignored if it fails to meet or exceed said thresholds. In an embodiment, an optimal network fractal complies with all geographical, regulatory, user, company thresholds or restrictions while maintaining or improving network coverage, network performance, reducing associated computational, and/or reducing power requirements. For example, program 150 generates a network fractal that reduces the number of broadband cells required to service an area while maintaining current performance standards. In another embodiment, program 150 incorporates broadband cell cost and maintenance in determining an optimal network fractal. In an embodiment, program 150 selects an optimal configuration of broadband cellular network infrastructure devices at each node in the plurality of nodes comprised in the generated network fractal. In this embodiment, program 150 selects the optimal configuration utilizing an optimization model (e.g., model 152) based on an iterative loop using predicted traffic, iterative loop of fractals, iterative loop of supported broadband cellular network infrastructure devices, and associated simulated network tests.

Program 150 builds a network utilizing generated fractal and cycled devices (step 210). Responsive to a selected generated network fractal with unique broadband cell placements, program 150 modifies, configures, and deploys a broadband cellular network utilizing said fractal and selected broadband cells as a deployment template. In an embodiment, program 150 utilizes automated vehicles to dynamically form and configure a broadband cellular network based on the selected network fractal. For example, program 150 utilizes one or more unmanned vehicles (e.g., unmanned aerial vehicles) to move one or more broadband cells to nodes dictated by the network fractal. In another embodiment, program 150 provides network configuration instructions to a human worker to assist in installing and removing broadband cells in accordance with the optimal network fractal and node placements. In this embodiment, program 150 provides the worker with augmented reality instructions allowing the worker to place one or more broadband cells in the optimal positions and locations. In an embodiment, if a specific network fractal and node placement is deployed, then program 150 continues to collect actual, real-time delivery of network data. In this embodiment, program 150 utilizes the collected network data to refine model 152 based on the comparison of predicted network against the actual results (i.e., error rates).

Figure 3:
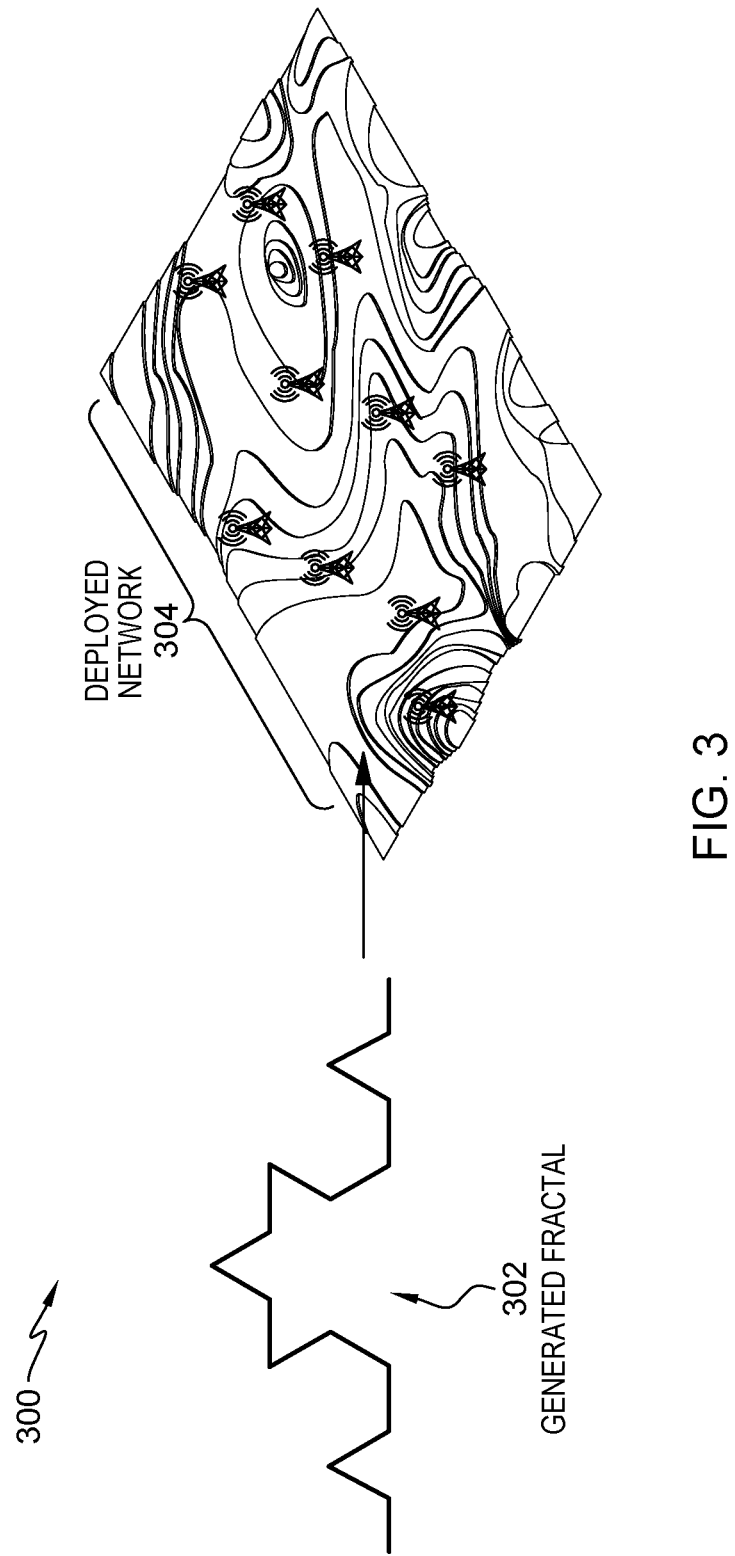
FIG. 3 is an example depicting fractal generation and network deployment, which illustrate the steps of the program within the computational environment of FIG. 1, in accordance with an embodiment of the present invention.

FIG. 3 depicts example 300, in accordance with an illustrative embodiment of the present invention. Example 300 contains generated fractal 302 and deployed network 304. Program 150 utilizes fractal generator 154 to create generated fractal 302 based on predicted network conditions utilizing model 152 and historical corpus 124. Here, generated fractal 302 represents an optimized broadband cellular network deployment capable of conforming to one or more restrictions and/or thresholds imposed on said network. Responsively, program 150 utilizes generated fractal 302 to deploy one or more components of the broadband cellular network represented by deployed network 304.

Figure 4:
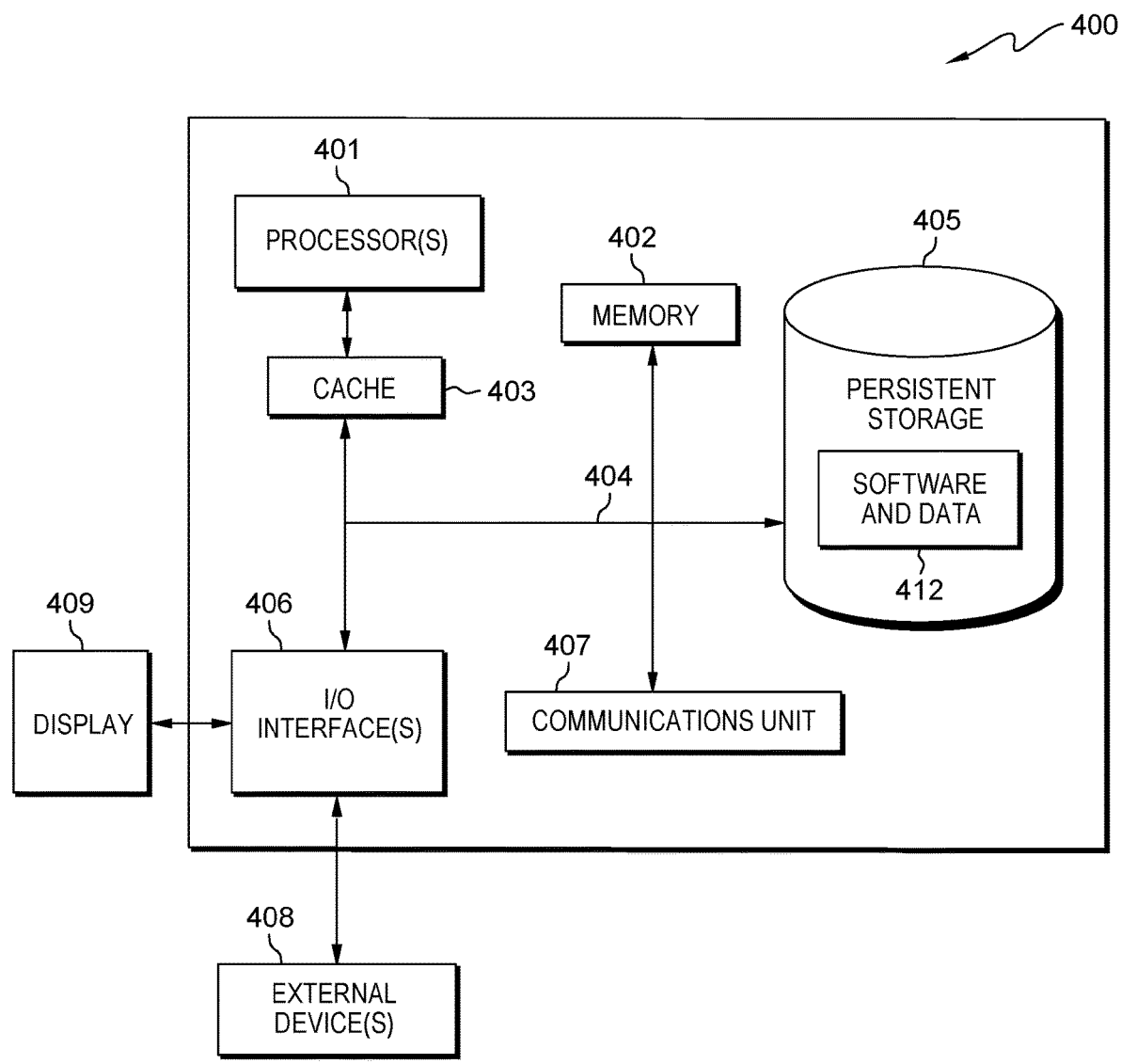
FIG. 4 is a block diagram of components of the server computer, in accordance with an embodiment of the present invention.

FIG. 4 depicts block diagram 400 illustrating components of computing device 110 and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
generating, by one or more computer processors, a network fractal based on one or more predicted network conditions for a network that includes a change in user density, user device latency, and network throughput, wherein the network fractal is a deployment template comprised of a plurality of nodes fractal, wherein each node in the plurality of nodes are respective intersection points of a respective initiator and a respective generator;

selecting, by one or more computer processors, a configuration of one or more network infrastructure device placed at each node in the plurality of nodes comprised in the generated network;

modifying, by one or more computer processors, the network utilizing the generated network fractal and the selected configuration of network infrastructure devices; and deploying, by one or more computer processors, the modified network.

2. The computer-implemented method of claim 1, wherein the configuration is selected utilizing an iterative loop using predicted traffic, an iterative loop of fractals, an iterative loop of network infrastructure devices, and respective simulated network tests.

3. The computer-implemented method of claim 1, wherein the network infrastructure devices comprise microcells, femtocells, picocells, and macrocells, wherein the macrocells comprise 5G towers.

4. The computer-implemented method of claim 1, wherein predicting network conditions utilizes linear regression techniques with historical network traffic based on a number of existing user devices, traffic in existing user devices, and user device types with an applied k-folds testing method.

5. The computer-implemented method of claim 1, wherein predicted network conditions include temporal predictions, geographical predictions, predicted user devices, predicted infrastructure utilization, predicted network interfaces, predicted power consumption, predicted security requirements, and predicted costs.

6. The computer-implemented method of claim 5, wherein the predicted costs include pricing information specific to each network infrastructure device, wherein the pricing information comprises cost per data transaction, cost per unit of data, and cost per unit of data dependent on existing network conditions.

7. A computer program product comprising:
one or more non-transitory computer readable storage media and program instructions stored on the one or more computer readable storage media, the stored program instructions comprising:
program instructions to generate a network fractal based on one or more predicted network conditions for a network that includes a change in user density, user device latency, and network throughput, wherein the network fractal is a deployment template comprised of a plurality of nodes, wherein each node in the plurality of nodes are respective intersection points of a respective initiator and a respective generator;
program instructions to select a configuration of one or more network infrastructure device placed at each node in the plurality of nodes comprised in the generated network fractal;
program instructions to modify the network utilizing the generated network fractal and the selected configuration of network infrastructure devices; and
program instructions to deploy the modified network.

8. The computer program product of claim 7, wherein predicting network conditions utilizes linear regression techniques with historical network traffic based on a number of existing user devices, traffic in existing user devices, and user device types with an applied k-folds testing method.

9. The computer program product of claim 7, wherein the configuration is selected utilizing an iterative loop using predicted traffic, an iterative loop of fractals, an iterative loop of network infrastructure devices, and respective simulated network tests.

10. The computer program product of claim 7, wherein the network infrastructure devices comprise microcells, femtocells, picocells, and macrocells, wherein the macrocells comprise 5G towers.

11. The computer program product of claim 7, wherein predicted network conditions include temporal predictions, geographical predictions, predicted user devices, predicted infrastructure utilization, predicted network interfaces, predicted power consumption, predicted security requirements, and predicted costs.

12. The computer program product of claim 11, wherein the predicted costs include pricing information specific to each network infrastructure device, wherein the pricing information comprises cost per data transaction, cost per unit of data, and cost per unit of data dependent on existing network conditions.

13. A computer system comprising:
one or more computer processors;
one or more non-transitory computer readable storage media; and
program instructions stored on the computer readable storage media for execution by at least one of the one or more processors, the stored program instructions comprising:
program instructions to generate a network fractal based on one or more predicted network conditions for a network that includes a change in user density, user device latency, and network throughput, wherein the network fractal is a deployment template comprised of a plurality of nodes, wherein each node in the plurality of nodes are respective intersection points of a respective initiator and a respective generator;
program instructions to select a configuration of one or more network infrastructure device placed at each node in the plurality of nodes comprised in the generated network fractal;
program instructions to modify the network utilizing the generated network fractal and the selected configuration of network infrastructure devices; and
program instructions to deploy the modified network.

14. The computer system of claim 13, wherein predicted network conditions include temporal predictions, geographical predictions, predicted user devices, predicted infrastructure utilization, predicted network interfaces, predicted power consumption, predicted security requirements, and predicted costs.

15. The computer system of claim 14, wherein the predicted costs include pricing information specific to each network infrastructure device, wherein the pricing information comprises cost per data transaction, cost per unit of data, and cost per unit of data dependent on existing network conditions.

16. The computer system of claim 13, wherein the configuration is selected utilizing an iterative loop using predicted traffic, an iterative loop of fractals, an iterative loop of network infrastructure devices, and respective simulated network tests.

17. The computer system of claim 13, wherein the network infrastructure devices comprise microcells, femtocells, picocells, and macrocells, wherein macrocells comprise 5G towers.

* * * * *